United States Patent [19]

Zandveld

[11] Patent Number: 5,740,220
[45] Date of Patent: Apr. 14, 1998

[54] SIGNAL GENERATING DEVICE INCLUDING PROGRAMMABLE COUNTERS AND A PROGRAMMABLE SERIAL BIT PATTERN GENERATOR

[75] Inventor: Frederik Zandveld, Eindohoven, Netherlands

[73] Assignee: U.S. Philips Corporation, New York, N.Y.

[21] Appl. No.: 744,499

[22] Filed: Nov. 7, 1996

Related U.S. Application Data

[63] Continuation of Ser. No. 499,556, Jul. 7, 1995, abandoned, which is a continuation of Ser. No. 93,230, Jul. 16, 1993, abandoned.

[30] Foreign Application Priority Data

Jul. 17, 1992 [EP] European Pat. Off. ............ 92202241

[51] Int. Cl.[6] .................................................. H03K 5/156
[52] U.S. Cl. ........................... 377/72; 377/52; 377/71; 395/555; 395/559
[58] Field of Search .......................... 377/52, 71, 72; 395/555, 559

[56] References Cited

U.S. PATENT DOCUMENTS

| | | | |
|---|---|---|---|
| 3,649,756 | 3/1972 | Roberts et al. | 178/23 A |
| 4,002,926 | 1/1977 | Moyer | 377/47 |
| 4,146,779 | 3/1979 | Osborne | 377/20 |
| 4,347,403 | 8/1982 | Schwager et al. | 327/107 |
| 4,348,902 | 9/1982 | Tachita et al. | 73/626 |
| 4,614,982 | 9/1986 | Ibaraki | 358/342 |
| 4,713,832 | 12/1987 | Hutson | 377/45 |
| 4,792,892 | 12/1988 | Mary et al. | 395/588 |
| 4,811,204 | 3/1989 | Fung | 395/860 |
| 4,845,654 | 7/1989 | Harada et al. | 364/717 |
| 4,975,640 | 12/1990 | Lipp | 371/22.6 |
| 5,010,559 | 4/1991 | O'Conner et al. | 375/368 |
| 5,090,035 | 2/1992 | Murase | 377/72 |
| 5,153,532 | 10/1992 | Albers et al. | 331/78 |
| 5,195,111 | 3/1993 | Adachi et al. | 377/52 |
| 5,235,423 | 8/1993 | Dunbar et al. | 348/571 |

FOREIGN PATENT DOCUMENTS

0267612  5/1988  European Pat. Off. .

OTHER PUBLICATIONS

Stallings, "Data and Computer Communications", 1991, p. 130.
Clements, "Microprocessor Systems Design", 1987 pp. 47–48.
Alan Clements, Microprocessor Systems Design, 1987, pp. 220–224 & 245–247 & 385–393.

*Primary Examiner*—Kenneth S. Kim
*Attorney, Agent, or Firm*—Brian J. Wieghaus

[57] ABSTRACT

Microprocessor with registered clock counting for at a predetermined count producing a command signal of adjustable shape, and a hierarchical interrupt system for use therewith.

A microprocessor comprises registered counting means that counts clock pulses. Upon attainment of a predetermined count it generates a command signal. Furthermore, it has a presettable input section that recurrently receives a variable preset count for downcounting, a secondary count section that is fed by said command signal output for counting successive command signals and under control of attainment of a predetermined count generates a secondary command signal on a secondary output. Next, a programmable registered pulse shaper mechanism under control of said secondary command signal executes serial shifting and outputs a shaped version of the secondary command signal. The above counting means is also associated to a parametrizeable interrupt priority mechanism.

16 Claims, 1 Drawing Sheet

1

SIGNAL GENERATING DEVICE INCLUDING PROGRAMMABLE COUNTERS AND A PROGRAMMABLE SERIAL BIT PATTERN GENERATOR

This is a continuation of application Ser. No. 08/499,556, filed Jul. 7, 1995, now abandoned, which is a continuation of application Ser. No. 08/093,230, filed Jul. 16, 1993 now abandoned.

BACKGROUND OF THE INVENTION

The invention relates to a microprocessor comprising registered counting means that have a clock input for under control of attainment of a predetermined clock count generating a command signal on a command signal output thereof. Various counting means have been described for use in a microprocessor, such as U.S. Ser. No. 07/048,841, filed May 1, 1987, now issued in U.S. Pat. No. -4,792,892. The reference relates to a microprocessor, wherein a program loop instruction has a delay field. Through this delay field, the actual start of the loop is delayed over a specified number of intervening instructions. After attaining the first loop instruction, both the number of instructions within a single execution of the loop and the number of successive executions of the loop are counted for so attaining a correct execution of the program. The present invention is not directed, however, to counting instructions.

A particularly interesting microprocessor architecture has been devised for the so-called SPARC processor, of which various features have been presented in the earlier, non-prepublished application U.S. Ser. No. 07/896,062, now issued U.S. Pat. No. 5,659,797 corresponding to EP 91 201 610.2; EP 92 201 737.1 to the same applicant, herein incorporated by reference. The present invention has recognized that a single microprocessor design, such as according to the second reference, but not limited thereto, could be amended for and/or directly run under various different clock pulse frequencies, retaining however the need for invariant execution of the intended program. This would represent a need for using programmable delays and recurrence times. Moreover, the eventual command signal could have a variable and programmable shape. Such problem coulds, inter alia, be compounded by the embedding of various hardware functionality levels on the same single chip, without the actually realizable scope thereof being known beforehand at the time of finalizing the original design. For example, one might wish to have the microprocessor sample an audio signal at a fixed recurrency, whereas the scope of other tasks could be much more variable.

SUMMARY OF THE INVENTION

Accordingly, amongst other things, it is an object of the present invention to provide an inexpensive realisation of such registered counting means that is applicable in, although not limited to an embedded environment, and allowing for uniform program execution as independent from an actual clock frequency and at a variably shapable secondary command signal. This means that the control of delays, periodicity, and shape of command signals would be rendered easier. Now, according to one of its aspects, the invention is characterized in that said counting means comprise a presettable input section that has said clock input and is arranged for recurrently receiving a variable preset count for counting to said predetermined clock count;

a secondary count section that is fed by said command signal output for counting successive said command signals and for under control of attainment of a predetermined command signal count generating a secondary command signal on a secondary output thereof;

a programmable registered pulse shaper mechanism that is fed by said secondary output for under control of said secondary command signal through serial shifting outputting a shaped version of said secondary command signal.

Advantageously, said sections and said mechanism are mapped on standard memory word lengths of said microprocessor. Specifically, it has been found that the feature of "alternate memory space" that is provided in certain processors, allows for straightforward mapping of one or more of such counting means on available hardware, such at easy accessibility.

The invention also relates to a hierarchical interrupt system for use with the above. Especially in case of various such registered timing means it has been found advantageous to allow for a plurality of interrupts, which are found to be easily manageable through the use of a hierarchization that may include parallel registers, masking and other features that by themselves could be conventional.

Various advantageous aspects of the invention are recited in dependent claims.

BRIEF DESCRIPTION OF THE DRAWINGS

Now, these and other aspects of the invention are discussed in detail with respect to the appended exemplary and non-limitative preferred embodiment, as further shown in and by the following figures that respectively represent.

DETAILED DESCRIPTION OF THE PREFERRED EMBODIMENT

Figure 1:
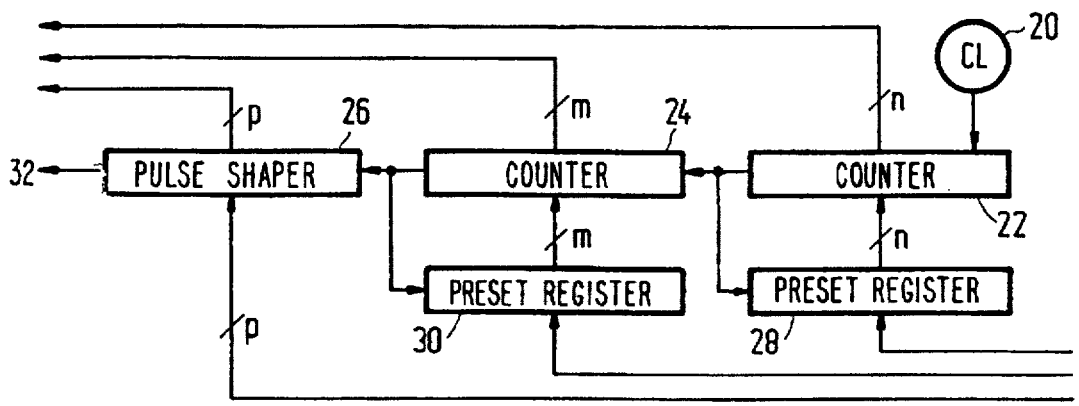
FIG. 1 a block diagram of a counting means as specified.

FIG. 1 is a block diagram of a counting means as specified according to the invention. Element 20 is a clock that may be the internal clock of the microprocessor in question. Elements 22, 24, 26 constitute a 64 bit register storage area. Register 22 has 32 bits and is arranged for downcounting to zero, which corresponds to upcounting to full. Upon generating an output signal, such as a borrow, to preset register 28, register 22 is presettable to the actual content of register 28. As long as clock 20 keeps running the presetting of register 22 recurs. As shown, register 28 may be loaded under software control that is not further shown for brevity. Likewise, the content of register 22 may be read as shown for testing purposes. Indirectly, this would mean the testing of register 28. The output signal of register 22 is input to register 24, that contains 24 bits and is also arranged for downcounting to zero under control of the counting pulses received from register 22. The output from register 24 drives register 30 for presetting register 24 at the actual content of register 30. The output from register 24 drives 8-bit register 26 that contains a programmable pulse shaper mechanism which through serial shifting outputs a shaped version of the command signal so received from register 24. The shaped signal on output 32 may drive appropriate further embedded elements of the microprocessor of which the arrangement of FIG. 1 forms a part. Likewise, external elements may be driven. A simplified version of FIG. 2 could do without the presettability through register 30; in that case register 24 can be arranged for upcounting and attaining of a predetermined count outputting a command signal while also resetting to zero, which generally is more complicated. All registers shown in FIG. 1 are modular at 8 bits, which is a standard length. However, other dimensions would do as well. As shown, also registers 30 and 26 can be loaded under software control, whereas registers 24 and 26 can be read for testing purposes.

Figure 2:
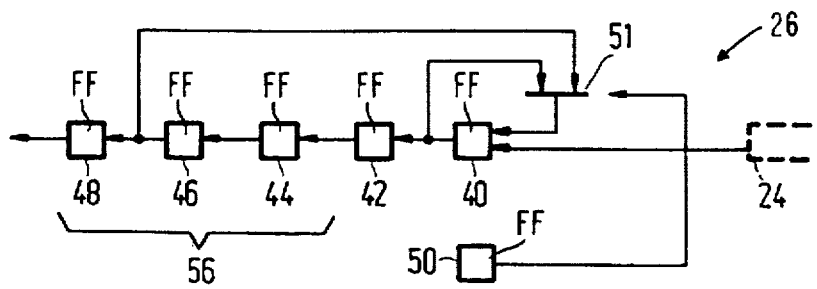
FIG. 2 a block diagram of a pulse shaper mechanism.

FIG. 2 is a block diagram of a pulse shaper mechanism according to the invention, that is realizable in register 26 of FIG. 1. Shown are five bit stages or flipflops 40 through 48 and selected interconnections therebetween. All bits are directly loadable from the software in a manner not shown. In particular, control thereto has been omitted. The overall input from register 24 as shown is to stage 40. Stages 40 to 48 are connected as a shift register, that has a shift pulse input 56; this may be fed in various ways by an appropriate frequency. The overall output is from stage 48. The content 0/1 of stage 50 controls the retrocoupling between stages 46 and 40, through a multiplexer functionality 51. If the retrocoupling is directly from stage 40, the contents thereof will continuously be reproduced. If the retrocoupling is from stage 46, a sequence of four bits will continuously be reproduced. Finally, the retrocoupling may be completely deactivated. First, if the retrocoupling is present from stage 46, loading the stages from left to right with "10101" will present a pattern of "10101010101" as long as shift pulses 56 remain active. Likewise, patterns "1000100010001.." and "0000100010001.."0 are feasible. If the retrocoupling is from stage 40, this may cause shaped commands like "11111 ... ", "0111 ... ", "000011111 ... ", or their inverses. If the retrocoupling is absent, the first value p1 loaded into stage 40 is the borrow signal from register 24, the second bit p2 is loaded one clock pulse later, the third bit p3 is the next borrow signal from register 24, the fourth bit p4 is loaded one clock later. Absent register 30, the latter two are continually repeated. The clock pulses on input 56 may be the same as those from clock 20 in FIG. 1, but other sources would be feasible as well.

Figure 3:
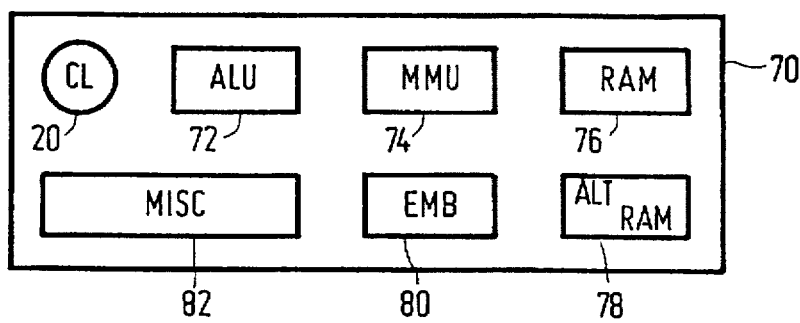
FIG. 3 a block diagram of a microprocessor with embedded additional functionality.

FIG. 3 is a block diagram of a single-chip microprocessor 70 with embedded additional functionality according to the invention. No further detailing on the register level is presented. Various subsystems are as follows. Clock 20 is the same as the one shown in FIG. 1. In certain situations, various parallel clocks may be present. Block 72 is an arithmetic and logic unit, that may be parameterized. Block 74 is a memory management unit of appropriate functionality level (cache, segmentation, paging, protection, etcetera). Block 76 is on-chip RAM. Sparc has a mapping mechanism onto an alternate memory that is part of a virtual memory and which has been symbolized by block 78, but which is not an additional hardware element of the processor. Available virtual address space is 32 bits wide in the Sparc architecture. Advantageously, the registered counting means is mapped on one of these alternate memory spaces: each such alternate memory address accommodates all register space used in FIG. 1, inclusive of preset registers. The loading and testing is done externally to such alternate memory address. Block 80 represents any further embedded functionality of which the effect is not needed for the present disclosure, but which receives the command signals emanated from the arrangement of FIG. 1. These command signals may also be used externally to the microprocessor in question. Block 82 represents further hardware provisions of the microprocessor. For brevity, the interconnections between the various subsystems in FIG. 3 have not been shown.

Figure 4:
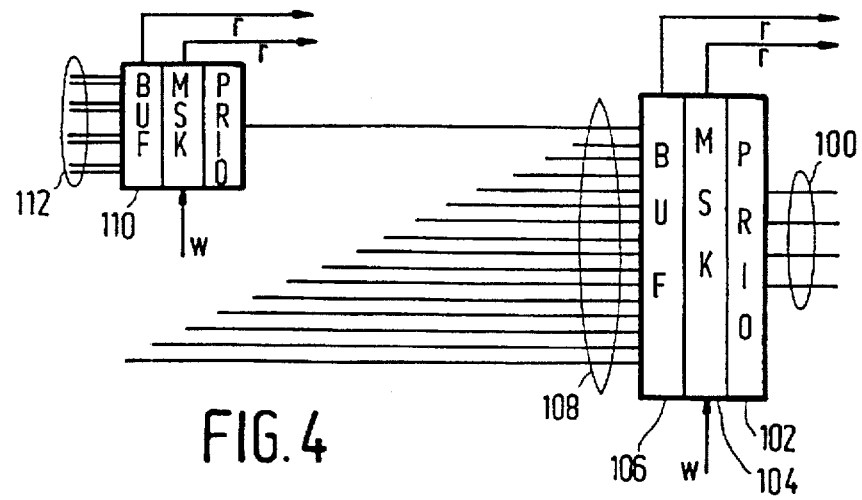
FIG. 4 a hierarchical interrupt system for use with the present invention.

FIG. 4 shows a hierarchical interrupt system for use with the present invention. The microprocessor according to FIG. 3 may allow for sixteen interrupts on wires 108 that are coded according to four bit channel 100, after determination of priority thereamong. This particular functionality has not yet been provided in Sparc, but the present inventor has found the need therefor as pressing. Priority may be determined in logic circuitry 102. Mask register 104 allows programmable masking or blocking of certain interrupts. Furthermore, there is input register 106 that can store interrupt flags or surges as they arrive on their associated input 108. As shown the mask register can be loaded along a write channel. Also, both mask register 104 and data register 106 may be read along read channels for testing purposes.

Now if within a certain microprocessor there occur various of the registered counting means according to the foregoing or other local or external interrupt, the arrangement 102/104/106 would become insufficient. Therefore, FIG. 4 has a second hierarchy layer of element 110 that is built according to the same principles as 102–106, inclusive of the loadability and readability features of elements 102/4/6. Block 110 itself feeds a single input of bundle 108. In this way, a multitude of inputs can be handled. The only thing not present in the arrangement is the signalling back to the sources of wires 112, which one is granted interrupt handling priority. Such acknowledge could be generated at the system level.

I claim:

1. A signal generating device, comprising:

a first programmable counting device having a count input coupled to a clock signal for generating a first control signal upon counting from a first selectively variable count value to a first final count value;

a second programmable counting device having a count input coupled to said first control signal for generating a second control signal upon counting from a second selectively variable count value to a second final count value; and a programmable serial bit pattern generator for outputting a serial bit stream output signal, said pattern generator comprising a serial shift register having a plurality of stages, said stages each having a (i) data input for receiving a data bit, whereby said shift register receives a programmed bit pattern value, and (ii) a shift input for receiving a shift control signal for controlling the frequency of shifting of data in said shift register, at least one of said stages having a data input for receiving successive bits of said second control signal, and control means for controlling the loading of said second control signal into said at least one stage so that said output signal selectively includes selected bits of said second control signal.

2. The signal generating device as set forth in claim 1, further comprising:

a first preset register for receiving said first selectively variable count value, said first preset register having a plurality of outputs coupled to respective preset inputs of said first programmable counting device; and, a second preset register for receiving said second selectively variable count value, said second preset register having a plurality of outputs coupled to respective preset inputs of said second programmable counting device.

3. The signal generating device as set forth in claim 1, wherein:

said first programmable counting device comprises a first decrementing counter; and, said first final count value is zero.

4. The signal generating device as set forth in claim 3, wherein:

said second programmable counting device comprises a second decrementing counter; and, said second final count value is zero.

5. A signal generating device for generating an output signal responsive to a recurrent clock signal, said device comprising:

a first programmable counter for generating a first control signal upon counting a programmed number of cycles of the clock signal, to thereby divide said clock signal by a programmably prescribed division factor;

a second programmable counter for generating a second control signal upon counting a programmed number of cycles of said first control signal, to thereby delay said first control signal by a programmably prescribed delay period; and a programmable serial bit pattern generator for generating a serial bit stream, said pattern generator comprising a serial shift register having a plurality of stages, said stages each having a (i) data input for receiving a data bit, whereby said shift register receives a programmed bit pattern value, and (ii) a shift input for receiving a shift control signal for controlling the frequency of shifting of data in said shift register, at least one of said stages having a data input for receiving successive bits of said second control signal, and control means for controlling the loading of said second control signal into said at least one stage so that said serial bit stream output signal selectively includes (1) selected bits of said second control signal and (2) bits in accordance with programming of said bit pattern generator.

6. The signal generating device as set forth in claim 5, further comprising a feedback loop for programming said bit pattern generator by selectively feeding back an output of at least one stage of said shift register to a data input of a first stage of said shift register, whereby said recurrent multibit pattern includes a number of bits greater than the number of said stages of said shift register.

7. The signal generating device as set forth in claim 6, wherein said feedback loop includes a multiplexer responsive to a control bit for selectively coupling the output of either of two different stages of said shift register to said data input of said first stage of said shift register.

8. The signal generating device as set forth in claim 5, wherein said programmed number of cycles of said clock signal is selectively variable.

9. The signal generating device as set forth in claim 5, wherein said programmed number of cycles of said first control signal is selectively variable.

10. The signal generating device as set forth in claim 8, wherein said programmed number of cycles of said first control signal is selectively variable.

11. The signal generating device as set forth in claim 5, wherein said programmed number of cycles of said clock signal is selectively variable in a range from 1 through m1, where m1 represents the modulus of said first programmable counter.

12. The signal generating device as set forth in claim 5, wherein said programmed number of cycles of said first control signal is selectively variable in a range from 1 through m2, where m2 represents the modulus of said second programmable counter.

13. The signal generating device as set forth in claim 5, wherein said recurrent multibit pattern comprises a sequence of consecutive, identical multibit patterns.

14. A method of generating a recurrent multibit pattern, comprising the steps of:

providing a clock signal;

dividing said clock signal by a first selected divisor, to thereby produce a first control signal;

delaying said first clock signal by a second selected divisor, to thereby produce a second control signal having, timewise, successive bits;

loading a selected bit pattern value into a shift register having a plurality of stages;

shifting said shift register in response to a shift clock signal in order to produce a serial bit stream having a recurrent multi-bit pattern related to said selected bit pattern value; and selectively loading successive bits of said second control signal into a stage of said shift register so that said serial bit stream includes selected bits of said second control signal.

15. The method as set forth in claim 14, further comprising the step of selectively feeding back an output of at least one stage of said shift register to a data input of a first stage of said shift register, whereby said recurrent multibit pattern includes a number of bits greater than the number of said stages of said shift register.

16. The method as set forth in claim 15, wherein the step of selectively feeding back is carried out by selectively coupling the output of either of two different stages of said shift register to said data input of said first stage of said shift register.

* * * * *